May 16, 1933.     A. L. BAUSMAN     1,908,812
MACHINE FOR DECORATING CONFECTIONS
Filed Oct. 21, 1930     4 Sheets-Sheet 1
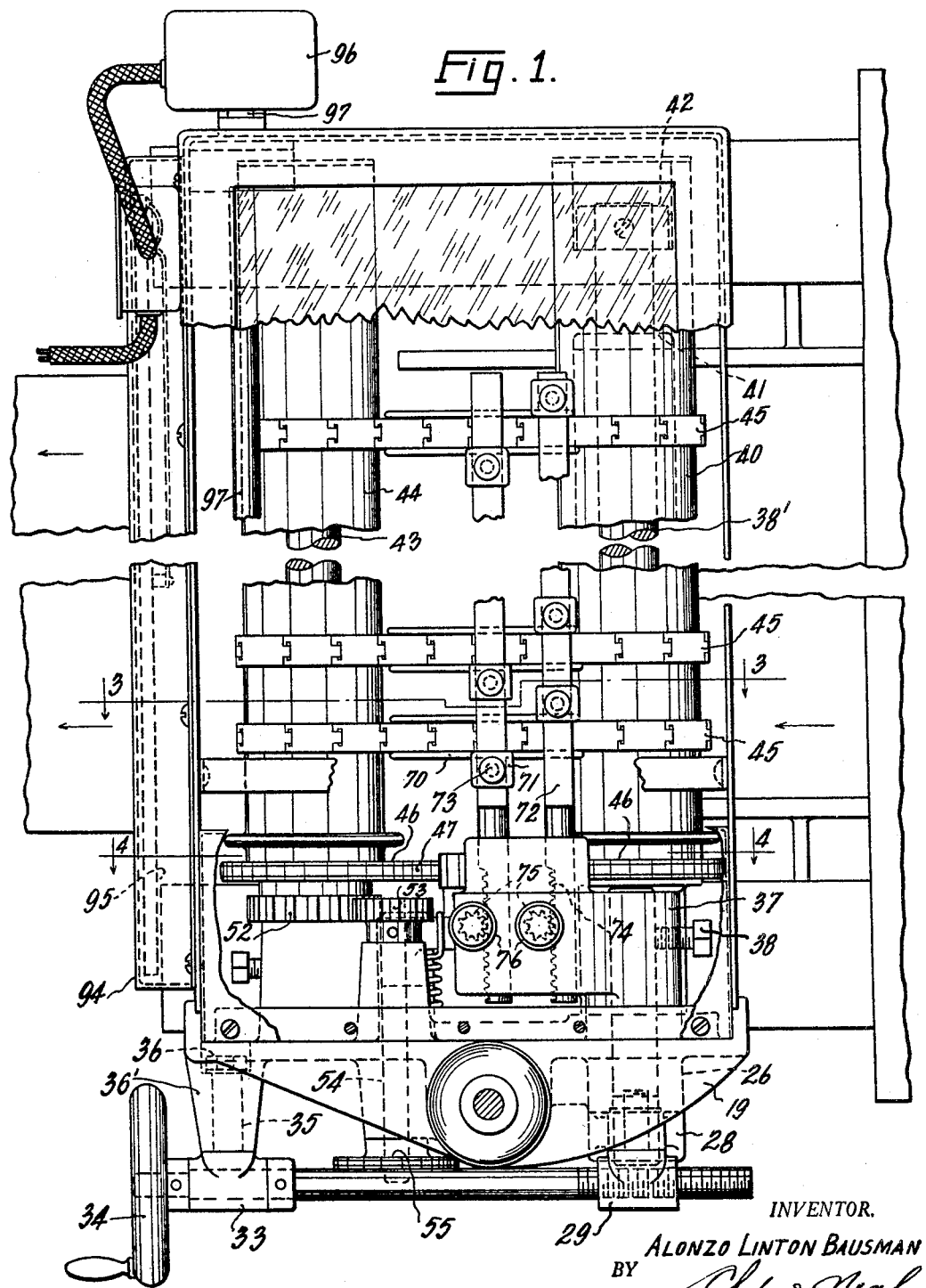
INVENTOR.
ALONZO LINTON BAUSMAN
BY
ATTORNEYS.

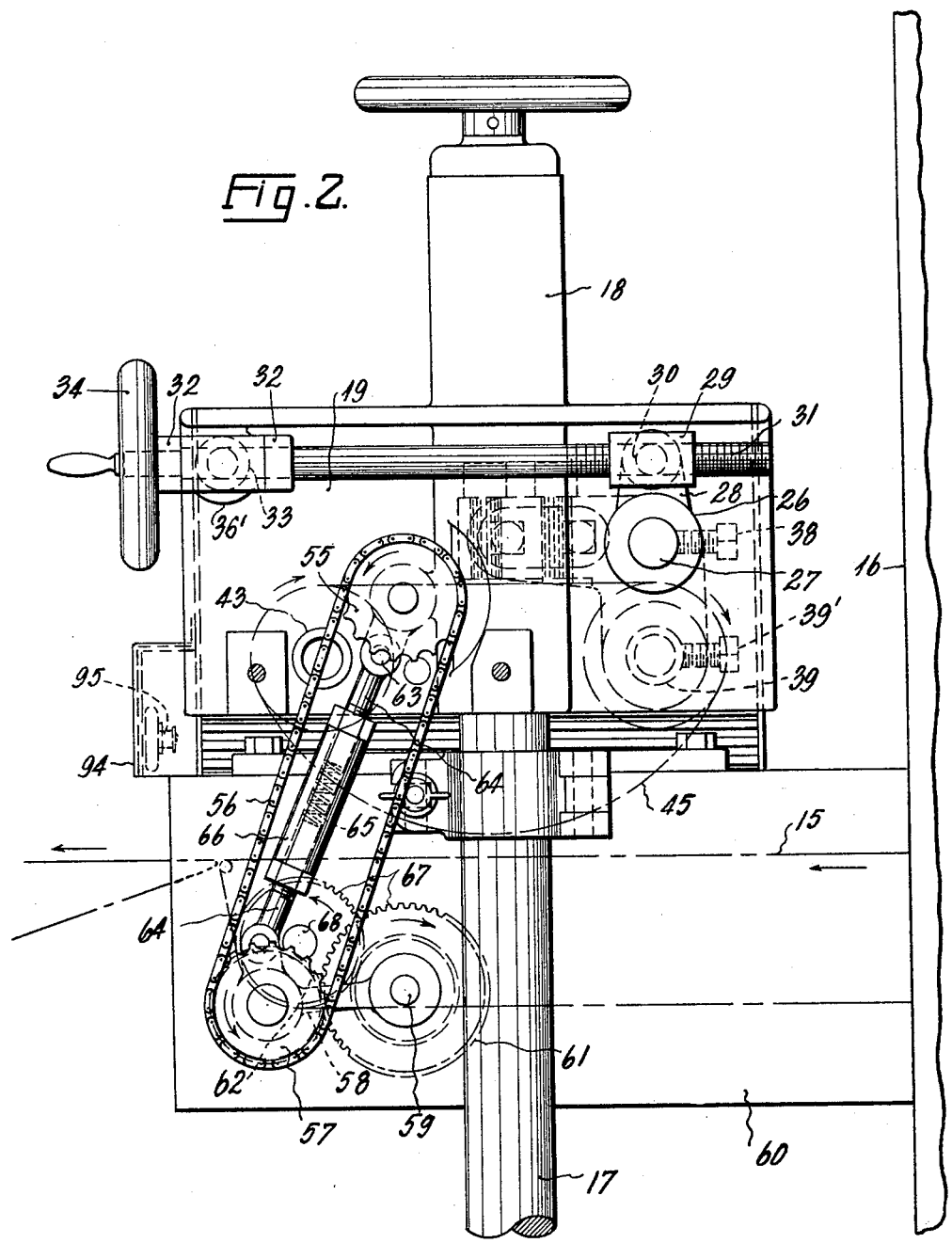

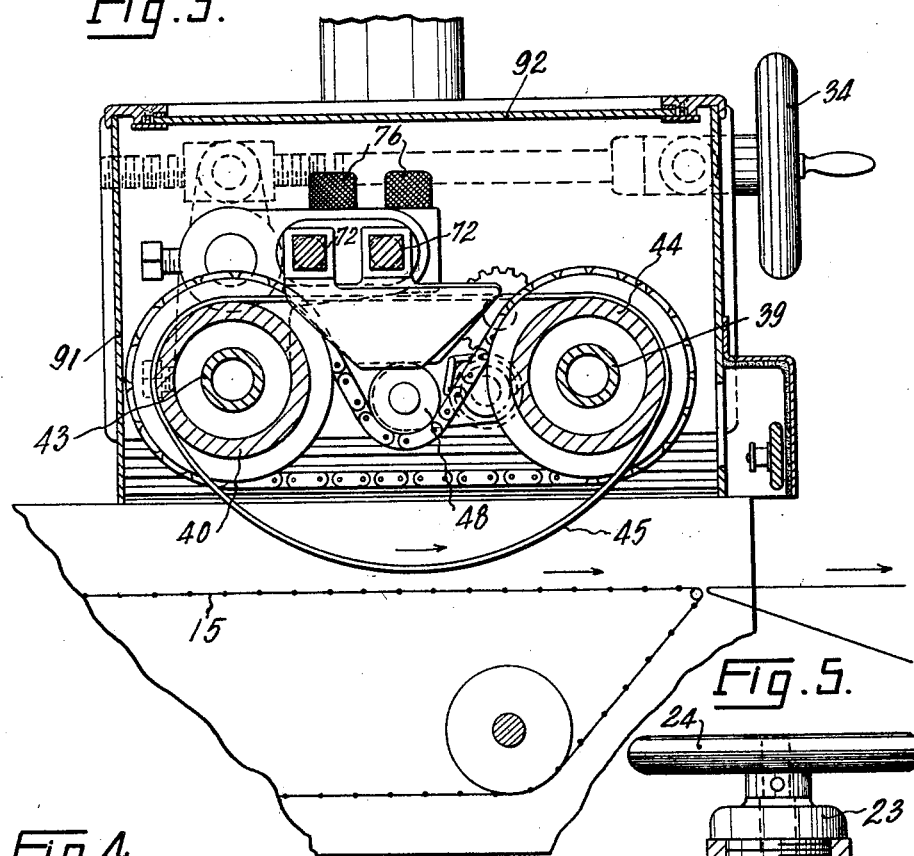
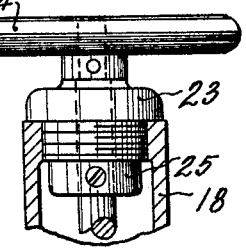
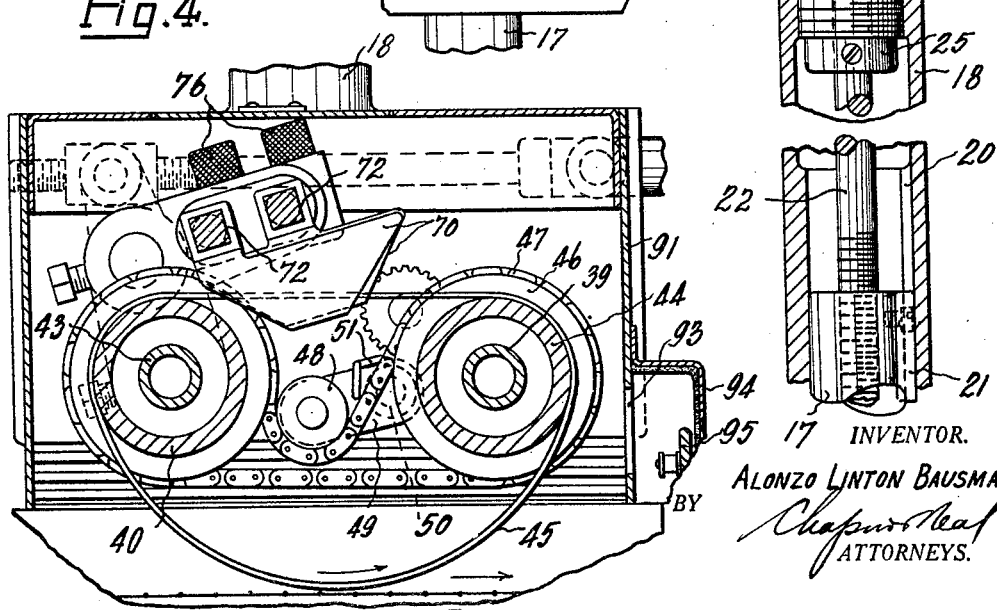

May 16, 1933. A. L. BAUSMAN 1,908,812
MACHINE FOR DECORATING CONFECTIONS
Filed Oct. 21, 1930   4 Sheets-Sheet 4

INVENTOR.
ALONZO LINTON BAUSMAN
BY
ATTORNEYS.

Patented May 16, 1933

1,908,812

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

MACHINE FOR DECORATING CONFECTIONS

Application filed October 21, 1930. Serial No. 490,150.

This invention relates to machines for decorating confections, and has for its object the production of an improved mechanism for laying upon the freshly coated confections a chain-like band which is subsequently lifted off. As the band is raised from the confections, their plastic coatings are drawn out, forming raised ornamentations. The mechanism provided by the present invention is of especial utility in preserving accurate but readily adjustable alignment of the bands which coact with the parallel rows of candies; in improving the control of the temperature of the bands, and in preventing the accumulation of chocolate coating on them; in permitting accurate adjustment of the vertical position of the lower runs of the bands; and in general in facilitating the several adjustments necessary to be made in changing from one style of confection to another, including the replacement of the bands with others of differing type.

Referring to the drawings:

Fig. 1 is a top plan of an apparatus embodying my invention with portions of the cover plates removed;

Fig. 2 is a front elevation thereof;

Fig. 3 is a section on line 3—3 of Fig. 1;

Fig. 4 is a section on line 4—4 of Fig. 1, generally similar to Fig. 3 but showing the parts in a different condition of adjustment;

Fig. 5 is a section through the vertical supporting post, showing the mechanism for adjusting the device vertically;

Figure 6:
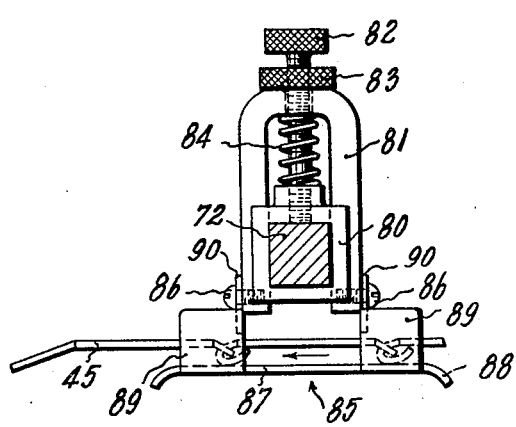
Fig. 6 is a sectional detail of a modified form of chain guide.

The decorating mechanism is preferably positioned to act upon the confections as they are delivered from the coating machine upon the usual wire belt which supports them during their passage through that mechanism. In the drawings the wire belt has been indicated conventionally at 15 and the coating machine at 16, neither being described in detail as they are both standard and well known in the art. The decorating device is supported on a post 17 which may arise from the frame of the coating machine or from a separate base capable of being removed when it is not desired. Upon the upper end of the post slides a sleeve 18, preferably formed integral with a frame 19 upon which the remaining parts of the mechanism are mounted. The sleeve is formed with an internal keyway 20 (Fig. 5) in which slides a key 21 secured to the post, so that the frame is at all times preserved in correct angular relationship. A screw 22 is threaded into the top of the post and passes through a bearing cap 23 secured to and closing the top of the sleeve. A handwheel 24 bears upon the top of the cap, and a collar 25 is fixed to the shaft just below it, so that while the shaft is free to rotate in the cap there can be no axial movement between them. By turning the handwheel the sleeve 18 and the frame 19 carried by it can be adjusted up or down as may be required.

Journaled in a bearing 26 (Fig. 2) in the frame 19 is a short shaft 27. This shaft projects from the frame on one side (Fig. 1) and has an arm 28 secured to it. A nut 29 is pivoted to the arm at 30 (Fig. 2) and has a rod 31 threaded into it. At its other end the rod is fitted with collars 32 which hold it against endwise motion in a bearing member 33 while permitting it to rotate. A handwheel 34 is secured to the end of the shaft. The bearing member 33 is fitted with a stud 35 (Fig. 1) secured by a nut 36 in a boss 36' projecting from the frame 19. As the handwheel is turned in one direction or the other, the shaft 27 will be rocked.

Also secured to the shaft 27, as by a set screw 38, is a bell crank 37. To one arm of this crank a shaft 39 is secured as by a set screw 39'. A roll 40 surrounds this shaft, and has internal bearing portions 41 (one only appearing in Fig. 1) which guide it for rotation. A collar 42 secured to the end of the shaft engages one of these bearing portions to prevent the roll from coming off. A second similar shaft 43 is secured in the frame 19 and has a roll 44 mounted upon it in a like manner. The roll 44 has its axis of rotation fixed in the machine, while the roll 40 can be moved relatively to it by turning the handwheel 34, which rocks the shaft 27 and consequently the bell crank 37. The purpose of this adjustment is to vary the sag of the decorating chains or to permit their removal, as will be more fully explained below.

The chains 45, the preferred detail construction of which will be considered later, are looped loosely over the two rolls so that their freely hanging lower runs will rest upon the coated confections traveling upon the wire belt 15. The chains are given a motion at the same surface speed as the wire belt by frictional contact with their supporting rolls, which are positively driven from the same mechanism which drives the belt. Each roll is provided with a sprocket 46 around which passes a chain 47. An idle sprocket or roll 48 engages the chain between the rolls and has a spring tension serving to keep the chain taut as the rolls are moved towards and away from each other. For this purpose, the idle sprocket is mounted upon an arm 49 (Fig. 4), pivoted at 50 to the frame 19 and constantly pressed in a direction to tighten the chain by a spring 51. The roll 44 is also provided with a gear 52 (Fig. 1) meshing with a gear 53 on a shaft 54. Upon the outer end of the shaft is a sprocket 55 connected by a chain 56 (Fig. 2) with a sprocket 57. The latter sprocket is journaled on a bracket 58 swinging upon a shaft 59 rotating in the frame 60 of the coating machine. A gear 61 on this shaft meshes with a gear 62 secured to the sprocket 57. This arrangement permits the driving relation between shaft 59 and sprocket 57 to be maintained irrespective of the height to which the frame 19 may be raised by the adjusting wheel 24. In order to preserve the proper tension on the chain 56 during this adjustment, the bracket 58 is coupled to a pivot point 63 on the frame 19 by an expansible link comprising rods 64 held apart by a spring 65 enclosed within a sheath 66. This link presses down the bracket 58, and hence the sprocket 57, so that irrespective of the height of the frame 19 the chain 56 will be kept taut. The shaft 59 is also connected by gearing 67 with a roll upon a shaft 68 around which the belt 15 passes and by which it is driven, so that the belt 15 and the chains 45 will be driven from the same source and at the same surface speed.

It is desirable to provide adjustable means for maintaining the several chains 45 properly spaced apart in the direction of the axes of the rolls 40 and 44. For this purpose a plurality of guide plates 70 (Fig. 1) are provided, each having a hub portion 71 with a square hole fitted to slide on one or the other of a pair of square rods 72, upon which they can be clamped by set screws 73. These rods have a sliding mounting in the horizontal arms of the bell crank 39. Each rod is formed with rack teeth 74 with which meshes a pinion 75 journaled in the bell crank 39 and fitted with a finger grip 76. This construction permits the guides 70 to be individually adjusted on the rods 72, or the entire series of guides on either rod moved as a unit by turning the proper finger grip.

It will be noted from a comparison of Figs. 3 and 4 that as the roll 40 is moved towards the roll 44 to slacken the chains the guide plates 70 are elevated. This is of service in permitting the chains to be removed with a minimum of interference, as when chains of one type are to be replaced by chains of another. It is not necessary that the guide plates be elevated completely above the roll surfaces, as the chains can be manipulated readily to throw sufficient slack into their upper runs to enable them to be slid off the rolls. The handwheel 34 thus performs a double function, varying the height of the bottom runs of the chains when the machine is in use, and freeing the chains for removal when the type of decoration is to be changed.

Figure 7:
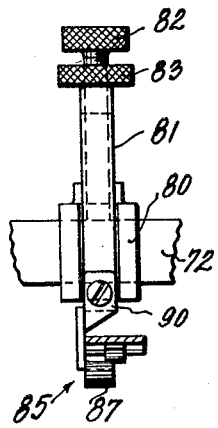
Fig. 7 is a view taken from the right in Fig. 6.

In Figs. 6 and 7 a modified type of chain guide is disclosed which adds another adjustment to those described. Each guide comprises a body portion 80 which has a square hole embracing one of the rods 72. In opposite sides of the body are formed grooves in which run the legs of a U-shaped member 81. A set screw 82 is threaded into the body portion 80, passing freely through the member 81 into an accessible position, and by its contact with the rod 72 holds the guide assembly adjustably in position. A thumb nut 83 is threaded on the shank of the set screw outside of the U-shaped member 81, which is constantly forced against the nut by a spring 84. By rotating this nut, the U-shaped member 81 can be raised or lowered with respect to the rod.

Upon the lower end of the U-shaped member 81 is a guide plate 85 secured as by screws 86. The plate may be made in any desired manner but is preferably constructed as follows. A bottom plate 87, curved downwardly at its ends as shown at 88, is preferably of sufficient width to extend halfway across the chain 45, and has bent up from it a pair of ears 89 which serve both as side guides for one side of the chain and as a support for the plate. From the ears 89 smaller ears 90 are bent at right angles, and are perforated to permit the passage of screws 86. The guides are arranged in pairs, a guide on one rod 72 coacting with one side of a chain and a guide on the other rod with the second side.

This modified form of chain guide possesses the advantage of enabling the slack of each decorating chain to be adjusted independently. Were each chain of the series spaced along the rolls 40, 44, of exactly the same length no such adjustment would be necessary when the wire belt carries confections of uniform height across it width. In practice, however, it is almost impossible to form the chains with sufficient accuracy so that they will not differ by a considerable amount in length. An error in link length is of course cumulative when the links are strung together into a chain, and the variation in length of individual chains will cause a considerable variation in the action of the chains upon the lines of confections. These variations in length can be compensated for by changes in the setting of the several adjusting nuts 83. These nuts are also of use in cases where lines of confections of different sorts are sent down the wire belt for coating and decorating. With one slack adjustment for all the parallel chains, the confections on the belt must be of uniform height during any run for best results. The additional adjustment described permits several types of candy to be run, individual adjustment being possible for variations in candy height or for the type of chain being used.

It is desirable to maintain the chains and the rolls at a temperature slightly above the melting point of chocolate, so that there will be no accumulation of hardened chocolate to interefere with the proper functioning of the device. I have found that better results are obtained by maintaining the air surrounding the rolls and the chains at a constant temperature than by heating the rolls directly. The reason appears to be the more rapid response and the decreased tendency to overrun the desired temperature of air heating as compared to roll heating means. The heating system chosen for illustration in the present case comprises a casing 91 (Fig. 3) surrounding the rolls and the chains except on the bottom, where the casing is preferably left open. The top of the casing is preferably formed with a removable glass door 92, permitting observation of the action of the mechanism at all times and adjustment when desired. At one side the casing is perforated with one or more holes 93 (Fig. 4), covered with a small casing 94 also open at the bottom. An electric heating element 95 is mounted within the small casing, and is preferably controlled in the usual manner by a thermostat 96 having a heat responsive member 97 extending within the main casing 91. The details of the electrical and mechanical construction of the thermostat and heater are well known and in themselves form no part of my present invention. They are therefore not described. The position of the heating element is preferably chosen as indicated, as it is protected against any deposit of chocolate and will not interfere with the removal or adjustment of the chains. The air circulation through the bottom of casing 94, through the holes 93, and around the interior of the main casing 91, is very effective in maintaining the proper conditions throughout the space surrounding the chains.

Figure 8:
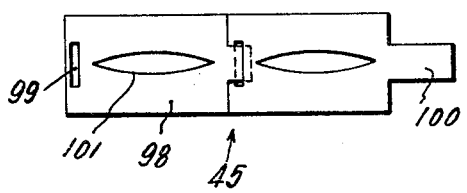
Fig. 8 is a plan view of one form of chain.
Figure 9:
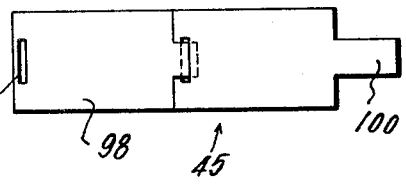
Fig. 9 is a similar view of another form.
Figure 10:
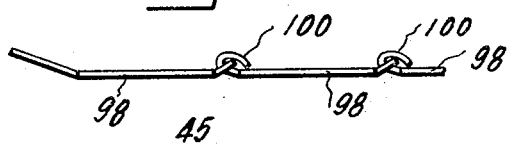
Fig. 10 is an elevation of the chain in the position it occupies during the decorating operation.
Figure 11:
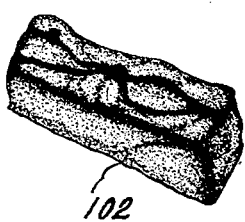
Fig. 11 is a perspective view of a confection illustrating a decoration made by the form of chain shown in Fig. 8.
Figures 12, 13:
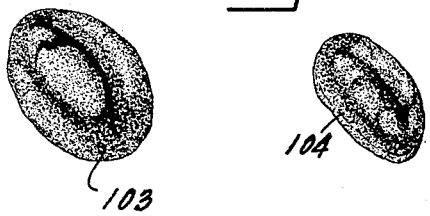
Figs. 12 and 13 are similar views showing the type of decoration made by the form of chain shown in Fig. 9.

The chains or articulated plaques which serve as the direct decorating agent are preferably flat, to present a substantial surface to the confection without sharp edges to dig through the coating. Each link of the chains has a flat body portion 98 provided at one end with a transverse slot 99 and at the other with a tongue 10. As shown in Fig. 10, the tongue of one link is inserted through the slot of the adjacent one, and is then bent over, leaving the side of the chain which is to contact with the confection substantially flat and without abrupt projections at the hinge. It will be observed that both the tongue and the slotted end of the plate are bent upwardly so that they meet above the candy contacting surface of the chain and prevent injury to the confection. The link plates may or may not be provided with central apertures 101 of any desired shape, this aperture producing an effect upon the decoration depending upon their form, although this form is not reproduced directly in the pattern. A candy decorated by the apertured plate of Fig. 8 is shown at 102 in Fig. 11, and a pair of confections 103 and 104 of differing size and shape decorated by the imperforate plate of Fig. 9 are shown in Figs. 12 and 13.

What I claim is:

1. A decorating device for use on candy coating machines comrising a pair of rolls, decorating chains looped around the rolls, means for rotating the rolls, and a plurality of chain guides mounted between the rolls.

2. A decorating device for use on candy coating machines as claimed in claim 1 having the chain guides arranged in two alternating series, and a pair of independently adjustable rods upon each of which one of said series of guides is mounted.

3. A decorating device for use on candy coating machines as claimed in claim 1, having means for moving the chain guides from between the rolls to permit the removal of the chains.

4. A decorating device for use on candy coating machines as claimed in claim 1, having means for shifting the rolls towards each other, means for moving the chain guides from between the rolls, and a single control for operating said shifting and moving means simultaneously.

5. A decorating device for use on candy coating machines comprising a frame, a roll journaled in the frame at one end with its other end unobstructed, a lever pivoted in the frame, a second roll journaled at one end in one arm of the lever with its other end unobstructed, means for adjusting the angular position of the lever about its pivot to change the spacing of the rolls, and one or more decorating chains looped around the rolls.

6. A decorating device for use on candy coating machines comprising a frame, a roll journaled in the frame at one end with its other end unobstructed, a bell crank pivoted in the frame, a second roll pivoted at one end in one arm of the bell crank with its other end unobstructed, a chain guide support secured to the second arm of the bell crank so as to extend parallel to the rolls, a series of chain guides mounted on the support so as to extend between the rolls, one or more decorating chains looped around the rolls between the chain guides, and means for adjusting the angular position of the bell crank about its pivot to change simultaneously the spacing of the rolls and the distance to which the chain guides project between the rolls.

7. A decorating device for use on candy coating machines comprising a frame, a roll journaled in the frame at one end with its other end unobstructed, a bell crank pivoted in the frame, a second roll pivoted at one end in one arm of the bell crank with its other end unobstructed, a pair of chain guide supports secured to the second arm of the bell crank so as to extend parallel to the rolls, a series of chain guides mounted in alternating series upon the two chain guide supports, means for clamping the individual chain guides independently to the supports, means for adjusting the two chain guide supports separately on the bell crank parallel to the axis of the rolls, a series of decorating chains looped around the rolls, each chain being positioned between a guide of one series and a guide of the second series, and means for adjusting the angular position of the bell crank about its pivot to change simultaneously the spacing of the rolls and the distance to which the chain guides project between the rolls.

8. A decorating device for use on candy coating machines comprising a pair of rolls, means for supporting and rotating the rolls, one or more decorating chains looped loosely around the rolls, a casing surrounding the rolls, and means for heating the air within the casing prior to its contact with the rolls or the chain.

9. A decorating device for use on candy coating machines as claimed in claim 13 in which the air heating means comprises a casing secured externally to the first casing and having apertures communicating both with the interior of the first casing and with the outside air, and a thermostatically controlled electric heating element mounted within said external casing.

10. A decorating device for use on candy coating machines comprising a pair of rolls, decorating chains looped around the rolls, means for rotating the rolls, a plurality of chain guides mounted between the rolls, each guide contacting with the flat face and at least one edge of a decorating chain, means for adjusting the guides in a direction parallel to the axes of the rolls, and means for adjusting the guides in a direction at right angles to the axes of the rolls to vary the slack in the individual chains.

11. A decorating device for use on candy coating machines comprising a pair of rolls, a plurality of parallel decorating chains passing around the rolls and having their lower runs hanging loosely, and mechanism for deflecting the upper run of each chain vertically independently of the others to vary in each case the amount of chain present in the loosely hanging lower run.

12. A decorating device for use on candy coating machines comprising, a band made up of a series of articulated plate-like plaques each having an area which is substantial in magnitude as compared with the surface of the confection to be decorated, and means for laying said band on and lifting it away from confections having a soft coating thereon.

13. A decorating device for use on candy coating machines comprising a band made up of a series of articulated plaques, each plaque having a flat tongue at one end and a slot at the other, the tongue of one plaque passing through the slot of the adjacent plaque and then being bent over to form a hinge, both the tongues and the slotted ends of the plaques being bent away from the candy contacting surface of the plaques so that no abrupt corner is presented at the hinge line, and means for laying said band on and lifting it away from confections having a soft coating thereon.

In testimony whereof I have affixed my signature.

ALONZO LINTON BAUSMAN.

CERTIFICATE OF CORRECTION.

Patent No. 1,908,812.  May 16, 1933.

ALONZO LINTON BAUSMAN.

It is hereby certified that error appears in the printed specification of the above numbered patent requiring correction as follows: Page 3, line 10, for "it" read "its"; page 4, line 57, claim 9, for the claim numeral "13" read "8"; and that the said Letters Patent should be read with these corrections therein that the same may conform to the record of the case in the Patent Office.

Signed and sealed this 18th day of July, A. D. 1933.

M. J. Moore.

(Seal)  Acting Commissioner of Patents.